US012538092B2

(12) United States Patent
Eronen et al.

(10) Patent No.: US 12,538,092 B2
(45) **Date of Patent: *Jan. 27, 2026**

(54) SPATIAL AUDIO PROCESSING

(71) Applicant: Nokia Technologies Oy, Espoo (FI)

(72) Inventors: Antti Eronen, Tampere (FI); Jussi Leppanen, Tampere (FI); Tapani Pihlajakuja, Vantaa (FI); Arto Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/590,112

(22) Filed: Feb. 28, 2024

(65) Prior Publication Data

US 2024/0205631 A1 Jun. 20, 2024

Related U.S. Application Data

(63) Continuation of application No. 17/577,468, filed on Jan. 18, 2022, now Pat. No. 11,943,604, which is a (Continued)

(30) Foreign Application Priority Data

May 18, 2017 (GB) ..................................... 1707953

(51) Int. Cl.
*H04S 7/00* (2006.01)
*G10L 19/008* (2013.01)
(Continued)

(52) U.S. Cl.
CPC ............ *H04S 7/303* (2013.01); *G10L 19/008* (2013.01); *G10L 21/0216* (2013.01); *G10L 2021/02166* (2013.01); *H04S 2400/11* (2013.01)

(58) Field of Classification Search
None
See application file for complete search history.

(56) References Cited

U.S. PATENT DOCUMENTS

2009/0190774 A1 7/2009 Wang
2013/0016842 A1 1/2013 Schultz-Amling et al.
(Continued)

FOREIGN PATENT DOCUMENTS

GB 2516056 A 1/2015
WO WO 2014/090277 A1 6/2014
WO WO 2017/005978 A1 1/2017

*Primary Examiner* — Qin Zhu
(74) *Attorney, Agent, or Firm* — McCarter & English, LLP

(57) ABSTRACT

An apparatus configured to: identify a POI in an audio scene, wherein one or more input audio signals represent the audio scene and at least one further input audio signal represents at least part of the audio scene, wherein the POI comprises a portion of the audio scene to be replaced during rendering using reconstructed audio parameters; generate, from the at least one further input audio signal, one or more complementary audio parameters that represent the POI in the audio scene; process the one or more input audio signals to obtain input audio parameters so as to enable replacement of the POI using the one or more complementary audio parameters; and combine the one or more complementary audio parameters with the input audio parameters, to create reconstructed audio parameters, so as to replace the POI in the audio scene at least partially using the one or more complementary audio parameters.

20 Claims, 3 Drawing Sheets

300

Related U.S. Application Data continuation of application No. 16/613,467, filed as application No. PCT/FI2018/050338 on May 8, 2018, now Pat. No. 11,259,137.

(51) Int. Cl.

| | |
|---|---|
| ***G10L 21/0216*** | (2013.01) |
| ***G10L 21/0272*** | (2013.01) |
| ***G10L 21/0364*** | (2013.01) |
| ***H04R 3/00*** | (2006.01) |
| ***H04S 3/00*** | (2006.01) |

(56) References Cited

U.S. PATENT DOCUMENTS

| | | | |
|---|---|---|---|
| 2015/0016641 | A1 | 1/2015 | Ugur |
| 2015/0156578 | A1 | 6/2015 | Alexandridis et al. |
| 2016/0118038 | A1 | 4/2016 | Eaton et al. |
| 2016/0125867 | A1 | 5/2016 | Jarvinen |
| 2016/0255453 | A1 | 9/2016 | Fueg |
| 2016/0293179 | A1 | 10/2016 | Thiergart et al. |
| 2017/0164133 | A1 | 6/2017 | Gunawan |
| 2018/0206039 | A1 | 7/2018 | Vilermo |
| 2018/0302738 | A1 | 10/2018 | Di Censo |

300

SPATIAL AUDIO PROCESSING

CROSS REFERENCE TO RELATED APPLICATION

This patent application is a continuation of U.S. patent application Ser. No. 17/577,468, filed Jan. 18, 2022, which is a continuation of U.S. patent application Ser. No. 16/613,467, filed Nov. 14, 2019, which is a U.S. National Stage application of International Patent Application Number PCT/FI2018/050338 filed May 8, 2018, which are hereby incorporated by reference in their entirety, and claims priority to GB 1707953.4 filed May 18, 2017.

TECHNICAL FIELD

The example and non-limiting embodiments of the present invention relate to processing spatial audio signals. In particular, some embodiments of the present invention relate to enhancement of perceivable spatial audio image represented by a spatial audio signal.

BACKGROUND

Spatial audio capture and/or processing enables storing and rendering audio scenes that represent both directional sound components of an audio scene at specific positions of the audio scene as well as the ambience of the audio scene. In this regard, directional sound components represent distinct sound sources that have certain position within the audio scene (e.g. a certain direction of arrival and a certain relative intensity with respect to a listening point), whereas the ambience represents environmental sounds within audio scene. Listening to such an audio scene enables the listener to experience an audio scene as he or she was at the location the audio scene serves to represent. An audio scene may be stored into a predefined format that enables rendering the audio scene for the listener via headphones and/or via a loudspeaker arrangement.

An audio scene may be obtained by using a microphone arrangement that includes a plurality of microphones to capture a respective plurality of audio signals and processing the audio signals into a predefined format that represents the audio scene. Alternatively, the audio scene may be created on basis of one or more arbitrary source signals by processing them into a predefined format that represents the audio scene of desired characteristics (e.g. with respect to directionality of sound sources and ambience of the audio scene). As a further example, a combination of a captured and artificially generated audio scene may be provided e.g. by complementing an audio scene captured by a plurality of microphones via introduction of one or more further sound sources at desired spatial positions of the audio scene.

In many real-life scenarios that at least partially rely on an audio scene captured by a microphone arrangement of a plurality of microphones, there are portions of the spatial audio scene contain undesired content. As a concrete example in this regard, while capturing (e.g. recording) the audio signals that represent the audio scene, unexpected factors such as persons may arrive at the site of capture and cause undesired noise in the captured signals. In another example, an undesired sound may enter the site of capture e.g. via a window (due to a microphone placed relatively close to the window). In a further example, an undesired sound component may originate from a device operating at the site of capture, e.g. from an air conditioning device. In a yet further example, a certain spatial position of the captured audio scene may include a dominating sound source of interest that may make correctly capturing ambience at and close to the certain spatial position a challenge. Consequently, spatial audio processing techniques that enable addressing such challenges in spatial audio capture serve to enable conveying the captured audio scene to the listener in an improved manner.

SUMMARY

According to an example embodiment, a method for spatial audio processing on basis of two or more input audio signals that represent an audio scene and at least one further input audio signal that represents at least part of the audio scene is provided, the method comprising identifying a portion of interest (POI) in the audio scene; processing the two or more input audio signals into a spatial audio signal where the POI in the audio scene is suppressed; generating, on basis of the at least one further input audio signal, a complementary audio signal that represents the POI in the audio scene; and combining the complementary audio signal with the spatial audio signal to create a reconstructed spatial audio signal.

According to another example embodiment, an apparatus for spatial audio processing on basis of two or more input audio signals that represent an audio scene and at least one further input audio signal that represents at least part of the audio scene is provided, the apparatus configured to identify a POI in the audio scene; process the two or more input audio signals into a spatial audio signal where the POI in the audio scene is suppressed; generate, on basis of the at least one further input audio signal, a complementary audio signal that represents the POI in the audio scene; and combine the complementary audio signal with the spatial audio signal to create a reconstructed spatial audio signal.

According to another example embodiment, an apparatus for spatial audio processing on basis of two or more input audio signals that represent an audio scene and at least one further input audio signal that represents at least part of the audio scene is provided, the apparatus comprising means for identifying a POI in the audio scene; means for processing the two or more input audio signals into a spatial audio signal where the POI in the audio scene is suppressed; means for generating, on basis of the at least one further input audio signal, a complementary audio signal that represents the POI in the audio scene; and means for combining the complementary audio signal with the spatial audio signal to create a reconstructed spatial audio signal.

According to another example embodiment, an apparatus for spatial audio processing on basis of two or more input audio signals that represent an audio scene and at least one further input audio signal that represents at least part of the audio scene is provided, wherein the apparatus comprises at least one processor; and at least one memory including computer program code, which when executed by the at least one processor, causes the apparatus to: identify a POI in the audio scene; process the two or more input audio signals into a spatial audio signal where the POI in the audio scene is suppressed; generate, on basis of the further audio signal, a complementary audio signal that represents the POI in the audio scene; and combine the complementary audio signal with the spatial audio signal to create a reconstructed audio signal.

According to another example embodiment, a computer program is provided, the computer program comprising computer readable program code configured to cause performing at least a method according to the example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 1:
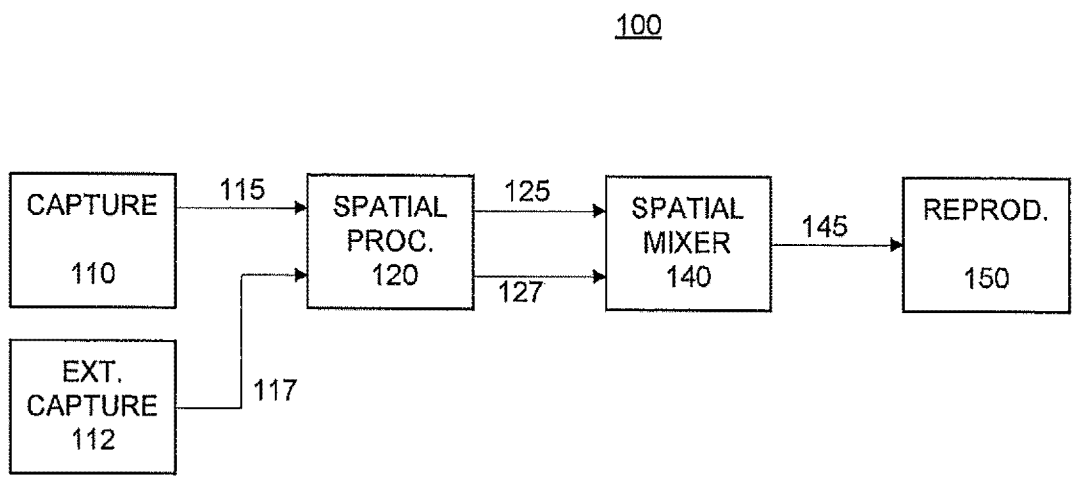
FIG. 1 illustrates a block diagram of some components and/or entities of an audio processing system within which one or more example embodiments may be implemented.

FIG. 1 illustrates a block diagram of some components and/or entities of a spatial audio processing system 100 that may serve as framework for various embodiments of a spatial audio processing technique described in the present disclosure. The audio processing system comprises an audio capturing entity 110 for capturing a plurality of input audio signals 115-*j* that represent an audio scene in proximity of the audio capturing entity 110, an external audio capturing entity 112 for capturing one or more further input audio signals 117-*k* that represent at least part of the audio scene represented by the input audio signals 115-*j*, a spatial audio processing entity 120 for processing the captured input audio signals 115-*j* into a spatial audio signal 125 and for processing the further input audio signal(s) 117-*k* into a complementary audio signal 127, a spatial mixer 140 for combining the spatial audio signal 125 and the complementary signal 127 into a reconstructed spatial audio signal 145, and an audio reproduction entity 150 for rendering the reconstructed spatial audio signal 145.

The audio capturing entity 110 may comprise e.g. a microphone array of a plurality of microphones arranged in predefined positions with respect to each other. The audio capturing entity 110 may further include processing means for recording a plurality of digital audio signals that represent the sound captured by the respective microphone of the microphone array. The recorded digital audio signals carry information that may be processed into one or more signals that enable conveying the audio scene at the location of capture for presentation to a human listener. The audio capturing entity 110 provides the plurality of digital audio signals to the spatial processing entity 120 as the respective input audio signals 115-*j* and/or stores these digital audio signals in a storage means for subsequent use. Each microphone of the microphone array employs a respective predefined directional pattern, selected according to the desired audio capturing characteristics. As non-limiting examples, all microphones of the microphone array may be omnidirectional microphones, all microphones of the microphone array may be directional microphones, or the microphone array may include a mix of omnidirectional and directional microphones.

The external audio capturing entity 112 may comprise one or more further microphones arranged into predefined positions with respect to each other and with respect to the plurality of microphones of the microphone array of the audio capturing entity 110. The one or more further microphones may comprise one or more separate, independent microphones and/or a further microphone array. The external audio capturing entity 112 may further include processing means for recording one or more further digital audio signals that represent the sound captured by the respective ones of the one or more further microphones. The recorded one or more further digital audio signals carry information that may be processed into one or more signals that enable complementing or modifying the audio scene derivable (or derived) from the input audio signals 115-*j* provided by the audio capturing entity 110. The external audio capturing entity 112 provides the one or more further digital audio signals to the spatial processing entity 120 as the respective one or more further input audio signals 117-*k* and/or stores these further digital audio signals in a storage means for subsequent use.

Each of the one or more further microphones provided in the external audio capturing entity 112 employs a respective predefined directional pattern, selected according to the desired audio capturing characteristics. The further microphone(s) may comprise omnidirectional microphones, directional microphones, or a mix of omnidirectional and directional microphones. In this regard, the directional pattern of any directional microphone may be further arranged to have its directional pattern pointed towards a respective predefined part of the audio scene.

In case the audio capturing entity 110 and/or the external audio capturing entity 112 makes use of one or more directional microphones, a directional microphone may be provided using any suitable microphone type known in the art that provides a directional pattern, for example, a cardioid directional pattern, a super cardioid, directional pattern or a hyper cardioid directional pattern.

The spatial audio processing entity 120 may comprise spatial audio processing means for processing the plurality of the input audio signals 115-*j* into the spatial audio signal 125 that conveys the audio scene represented by the input audio signals 115-*j*, possibly modified in view of spatial audio analysis carried out in the spatial audio processing entity 120 and/or in view of user input received therein. The spatial audio processing entity 120 may further process the further one or more input audio signals 117-*k* into the complementary audio signal 127 in view of the spatial audio analysis carried out on basis of the input audio signal 115 and/or in view of user input received in the spatial audio processing entity 120. The spatial processing entity 120 may also be referred to as a spatial encoder or as a spatial encoding entity. The spatial audio processing entity 120 may provide the spatial audio signal 125 and the complementary audio signal 127 for further processing by the spatial mixer 140 and/or for storage in a storage means for subsequent use.

The spatial mixer 140 may process the spatial audio signal 125 and the complementary audio signal 127 into the reconstructed spatial audio signal 145 in a predefined format that is suitable for audio reproduction by the audio reproduction entity 150. The audio reproduction entity 150 may comprise, for example, headphones, a headset or a loudspeaker arrangement of one or more loudspeakers.

Instead of using the audio capturing entity 110 as a source of the input audio signals 115-*j* and the further input audio signal(s) 117-*k*, the audio processing system 100 may include a storage means for storing pre-captured or pre-created plurality of input audio signals 115-*j* together with the corresponding one or more further input audio signals 117-*k*. Hence, the audio processing chain may be based on the audio input signals 115-*j* and the further audio inputs signal(s) 117-*k* that are read from the storage means instead of relying on input audio signals 115-*j*, 117-*k* received (directly) from the respective audio capturing entity 110, 112.

Figure 2:
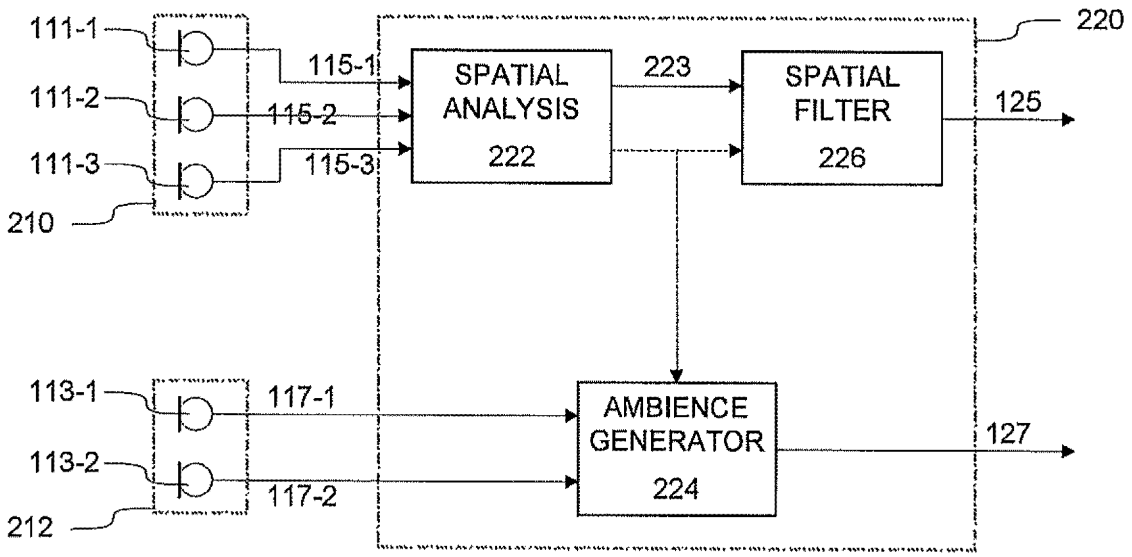
FIG. 2 illustrates a block diagram of some components and/or entities of an audio encoder according to an example.

In the following, some aspects of operation of the spatial audio processing entity 120 are described via a number of examples, whereas other entities of the audio processing system 100 are referred to extent they necessary for understanding of the respective aspect of operation of the spatial audio processing entity 120. In this regard, FIG. 2 illustrates a block diagram of some components and/or entities of a spatial audio encoder 220 according to an example. The spatial audio encoder 220 may include further components and/or entities in addition to those depicted in FIG. 2. The spatial audio encoder 220 may be provided, for example, as the audio encoding entity 120 or as part thereof in the framework of the audio processing system 100. In other examples, the spatial audio encoder 220 may be provided e.g. as an element of an audio processing system different from the audio processing system 100 or it may be provided as an independent processing entity that reads the input audio signals 115-*j* and the further input audio signal(s) 117-*k* from and/or writes the spatial audio signal 125 and the complementary audio signal 127 to a storage means (e.g. a memory).

FIG. 2 further illustrates a block diagram of some components and/or entities of an audio capturing entity 210 and an external audio capturing entity 212 according to respective examples. Each of the audio capturing entity 210 and the external audio capturing entity 212 may include further components and/or entities in addition to those depicted in FIG. 2. The audio capturing entity 210 may be employed, for example, as the audio capturing entity 110 or as a part thereof in the framework of the audio processing system 100, whereas the external audio capturing entity 212 may be employed, for example, as the external audio capturing entity 112 or as a part thereof in the framework of the audio processing system 100. In an example, the audio capturing entity 210 is arranged in the same device with the spatial audio encoder 220, whereas the external audio capturing entity 212 is provided in another device that is communicatively coupled to the device hosting the spatial audio encoder 220 and the audio capturing entity 210. In an example, the audio capturing entity 210 is arranged to write the plurality of input audio signals 115-*j* to a storage means (e.g. a memory) and the external audio capturing entity 212 is arranged to write the one or more further input audio signals 117-*k* to the storage means.

In the example of FIG. 2, the audio capturing entity 210 is illustrated with a microphone array 111 that includes microphones 111-1, 111-2 and 111-3 arranged in predefined positions with respect to each other. The microphones 111-1, 111-2 and 111-3 serve to capture sounds that are recorded as respective digital audio signal and conveyed from the audio capturing entity 210 to the spatial audio encoder 220 as respective input audio signals 115-1, 115-2 and 115-3. The external audio capturing entity 212 includes further microphones 113-1 and 113-2 that serve to capture sounds that are recorded as respective further digital audio signals and conveyed from the external audio capturing entity 212 to the spatial audio encoder 220 as respective further input audio signals 117-1 and 117-2.

The example of FIG. 2 generalizes into receiving, at the spatial audio encoder 220, two or more input audio signals 115-*j* that may be jointly referred to as an input audio signal 115 and one or more further input audio signals 117-*k* that may be jointly referred to as an further input audio signal 117. In the spatial audio encoder 220, the input audio signals 115-*j* are received by a spatial analysis portion 222, whereas the further input audio signal(s) 117-*k* are received by the ambience generation portion 224.

The input audio signals 115-*j* serve to represent an audio scene captured by the microphone array 111. The audio scene may also be referred to as a spatial audio image. The spatial analysis portion 222 operates to process the input audio signals 115-*j* to form two or more processed audio signals that convey the audio scene represented by the input audio signals 115-*j*. The further input audio signals 117-*k* serve to represent at least part of the audio scene represented by the digital audio signals 115-*j*.

Figure 3:
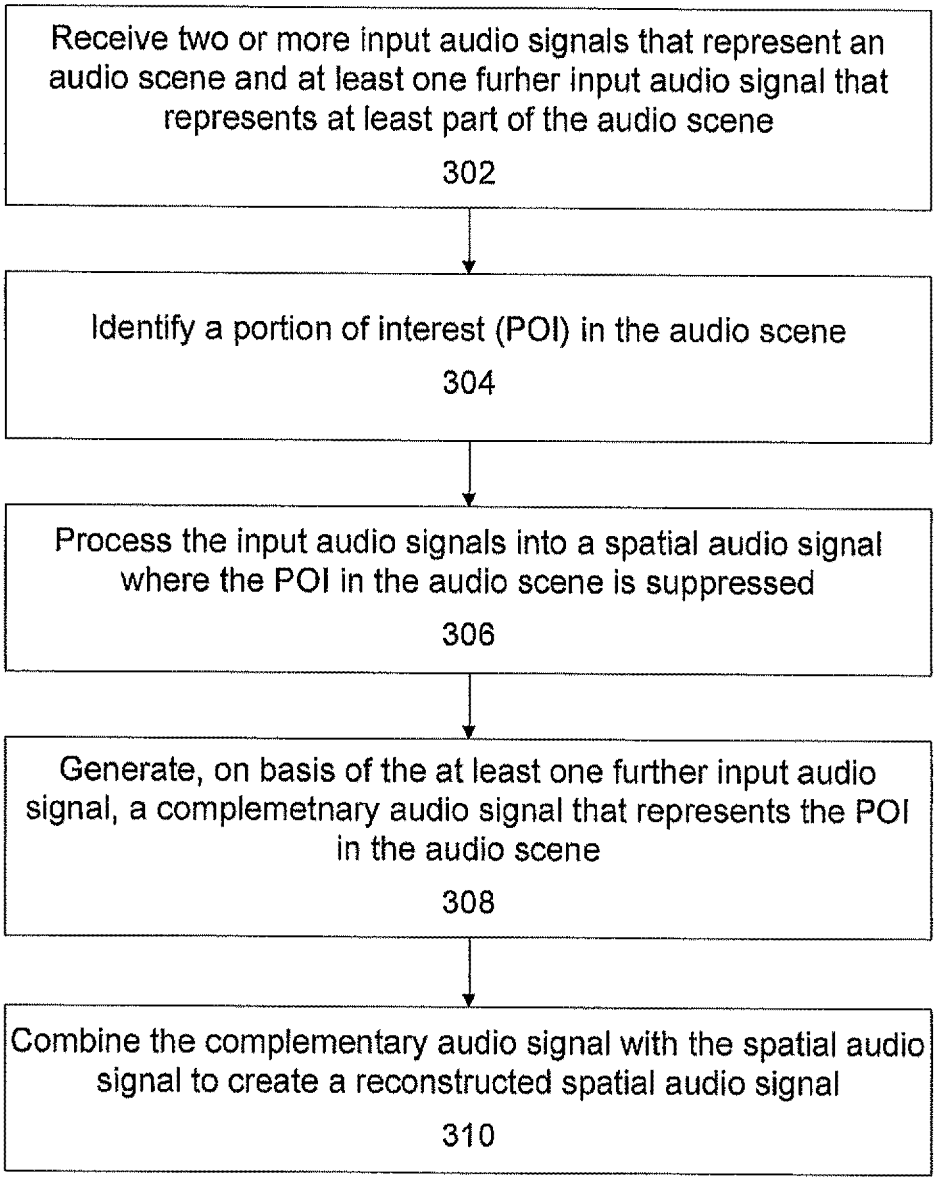
FIG. 3 illustrates a method according to an example.

The audio scene represented by the input audio signals 115-*j* may be considered to comprise a directional sound component and an ambient sound component, where the directional sound component represents one or more directional sound sources that each have a respective certain position in the audio scene and where the ambient sound component represents non-directional sounds in the audio scene. Each of the directional sound component and the ambient sound component may be represented by one or more respective audio signals, possibly complemented by spatial audio parameters that further characterize the audio scene. The directional and ambient sound components may be formulated into the spatial audio signal 125 in a number of ways. An example in this regard involves processing the input audio signals 115-*j* into a first signal and a second signal such that they jointly convey information that can be employed by the spatial mixer 140 to create the reconstructed spatial audio signal 145 that represents or at least approximates the audio scene. In such an approach the first signal may be employed to (predominantly) represent the one or more directional sound sources while the second signal may be employed to represent the ambience. In an example, the first signal may comprise a mid signal and the second signal may comprise a side signal As a non-limiting example, the operation of the spatial encoder 220 to generate the spatial audio signal 125 on basis of the plurality of input audio signals 115-*j* and to generate the complementary audio signal 127 on basis of the one or more further input audio signals 117-*k* is outlined by steps of a method 300 depicted by the flow diagram of FIG. 3. The method 300 proceeds from receiving the plurality of input audio signals 115-*j* that represent an audio scene and the one or more further input audio signals 117-*k* that represents at least part of the audio scene, as indicated in block 302. The method 300 continues by identification of a portion of interest (POI) in the audio scene, as indicated in block 304, and processing of the input audio signal 115 into the spatial audio signal 125 where the POI in the audio scene is suppressed, as indicated in block 306. Moreover, the method 300 further proceeds into generating one or more audio signals on basis of the further input audio signal 117 to serve as the complementary audio signal 127 that represents the POI in the audio scene, as indicated in block 308, the complementary audio signal 127 hence serving as a substitute for the POI in the audio scene represented by the input audio signal 115. The method 300 further proceeds to combining the complementary audio signal 127 with the spatial audio signal 125 to create the reconstructed spatial audio signal 145. While examples pertaining to operations of block 302 are described in the foregoing, examples pertaining to operations of each of the blocks 304 to 310 are provided in the following.

In the following, the description of examples pertaining to operations of blocks 304 to 310 assumes above-described approach of using the first signal to represent the one or more directional sound sources of the audio scene and the second signal to represent the ambience of the audio scene by referring to the first signal as the mid signal and to the second signal as the side signals as the spatial audio signal 125. This, however, serves as a non-limiting example chosen for clarity and brevity of the description and a different format of the spatial audio signal 125 may be applied instead without departing from the scope of the present disclosure.

The spatial analysis portion 222 may carry out a spatial audio analysis that involves deriving the one or more spatial audio parameters and identification of the POI at least in part on basis of the derived spatial audio parameters. In this regard, the derived spatial audio parameters may be such that they are useable both for creation of the spatial audio signal 125 on basis of the input audio signals 115-*j* and for identification of the POI within the audio scene they serve to represent.

As a pre-processing step before that actual spatial audio analysis, the spatial analysis portion 222 may subject each of the digital audio signals 115-*j* to short-time discrete Fourier transform (STFT) to convert the input audio signals 115-*j* into respective frequency domain signals using a predefined analysis window length (e.g. 20 milliseconds), thereby segmenting each of the input audio signals 115-*j* into a respective time series of frames. For each of the input audio signals 115-*j*, each frame is further divided into a predefined frequency bands (e.g. 32 frequency bands), thereby resulting a time-frequency representation of the input audio signals 115-*j* that serves as basis for the spatial audio analysis. A certain frequency band in a certain frame may be referred to as a time-frequency tile. The spatial analysis by the spatial analysis portion 222 may involve deriving at least the following spatial parameters for each time-frequency tile:

- a direction of arrival (DOA), defined by an azimuth angle and/or an elevation angle derived on basis of the input audio signals 115-*j* in the respective time-frequency tile; and
- a direct-to-ambient ratio (DAR) derived at least in part on basis of coherence between the digital audio signals 115-*j* in the respective time-frequency tile.

The DOA may be derived e.g. on basis of time differences between two or more audio signals that represent the same sound(s) and that are captured using respective microphones having known positions with respect to each other (e.g. the input audio signals 115-*j* obtained from the respective microphones 111-*j*). The DAR may be derived e.g. on basis of coherence between pairs of input audio signals 115-*j* and stability of DOAs in the respective time-frequency tile. In general, the DOA and the DAR are spatial parameters known in the art and they may be derived by using any suitable technique known in the art. An exemplifying technique for deriving the DOA and the DAR is described in WO 2017/005978.

The spatial analysis may optionally involve derivation of one or more further spatial parameters for at least some of the time-frequency tiles. As an example in this regard, the spatial analysis portion 222 may compute one or more delay values that serve to indicate respective delays (or time shift values) that maximize coherence between a reference signal selected from a subset of the input audio signals 115-*j* and between other signal of the subset of the input audio signals 115-*j*. Regarding an example of selecting the subset of the input audio signals 115-*j*, please refer to the following description regarding derivation of the mid and side signals to represent, respectively, the directional sounds of the audio scene and the ambience of the audio scene.

For each time-frequency tile, the spatial analysis portion 222 selects a subset of the input audio signals 115-*j* for derivation of a respective mid signal component. The selection is made in dependence of the DOA, for example such that a predefined number of input audio signals 115-*j* (e.g. three) obtained from respective microphones 111-*j* that are closest to the DOA in the respective time-frequency tile are selected. Among the selected input audio signals 115-*j* the one originating from the microphone 111-*j* that is closest to the DOA in the respective time-frequency tile is selected as a reference signal and the other selected input audio signals 115-*j* are time-aligned with the reference signal. The mid signal component for the respective time-frequency tile is derived as a combination (e.g. a linear combination) of the time-aligned versions of the selected input audio signals 115-*j* in the respective time-frequency tile. In an example, the combination is provided as a sum or as an average of the selected (time-aligned) input audio signals 115-*j* in the respective time-frequency tile. In another example, the combination is provided as a weighted sum of the selected (time-aligned) input audio signals 115-*j* in the respective time-frequency tile such that a weight assigned for a given selected input audio signal 115-*j* is inversely proportional to the distance between DOA and the position of the microphone 111-*j* from which the given selected input audio signal 115-*j* is obtained. The weights are typically selected or scaled such that their sum is equal or approximately equal to unity. The weighting may facilitate avoiding audible artefacts in the reconstructed the reconstructed spatial audio signal 155 in a scenario where the DOA changes from frame to frame.

For each time-frequency tile, the spatial analysis portion 222 makes use of all input audio signals 115-*j* for derivation of a respective side signal component. The side signal component for the respective time-frequency tile is derived as a combination (e.g. a linear combination) of the input audio signals 115-*j* in the respective time-frequency tile. In an example, the combination is provided as a weighted sum of the input audio signals 115-*j* in the respective time-frequency tile such that the weights are assigned an adaptive manner, e.g. such that the weight assigned for a given input audio signal 115-*j* in a given time-frequency tile is inversely proportional to the DAR derived for the given input audio signal 115-*j* in the respective time-frequency tile. The weights are typically selected or scaled such that their sum is equal or approximately equal to unity.

The side signal components may be further subjected decorrelation processing before using them for constructing the side signal. In this regard, there may be a respective predefined decorrelation filter for each of the frequency bands (and hence for the side signal component of the respective frequency band), and the spatial analysis portion 222 may provide the decorrelation by convolving each side signal with the respective predefined decorrelation filter.

The spatial analysis portion 222 may derive the mid signal for a given frame by combining the mid signal components derived for frequency bands of the given frame, in other words by combining the mid signal components across frequency tiles of the given frame. Along similar lines, the spatial analysis portion 222 may derive the side signal for the given frame by combining the side signal components derived for frequency bands of the given frame, in other words by combining the side signal components across frequency tiles of the given frame.

The mid signal and the side signal so derived constitute an initial spatial audio signal 223 for the respective frame. The initial spatial audio signal 223 typically further comprises spatial parameters derived for the respective frame, e.g. one or more of the DOA and DAR or derivatives thereof to enable creating the reconstructed spatial audio signal 145 by the spatial mixer 140.

Referring to operations pertaining to block 304, according to an example, the identification of the POI comprises identifying the POI at least in part on basis of one or more spatial parameters extracted from the input audio signal 115 (e.g. the input audio signals 115-*j*). In another example, the identification of the POI comprises receiving an indication of the POI from an external source, e.g. as user input received via a user interface.

In an example, the POI may serve to indicate a problematic portion in the audio scene that is to be replaced in order to improve perceivable quality of the audio scene in the reconstructed spatial audio signal 145. In such a scenario, the POI may be identified, for example, via analysis of one or more extracted spatial parameters or on basis of input from an external source. In another example, the POI may serve to indicate a portion of the audio scene that is to be replaced for aesthetic and/or artistic reasons. In such a scenario, the POI is typically identified on basis of input from an external source.

The POI may concern e.g. one of the following:

a specified spatial portion in the ambient sound component of the audio scene;

a specified spatial portion in the directional sound component of the audio scene;

a specified spatial portion in both the ambient sound component and in the directional sound component of the audio scene.

Regardless of a POI concerning the ambient sound component, the directional sound component or both, the POI may be defined to cover a specific direction or as a range of directions. The direction covered by the POI may be expressed by an azimuth angle and/or an elevation angle that identify a specific direction of arrival that constitutes a spatial region of interest within the audio scene. In another example, the direction(s) covered by the POI may be defined via a range of azimuth angles and/or a range of elevation angles that identify a sector within the audio scene that constitutes the region of interest therein. A range of angles (either azimuth or elevation) may be defined, for example, by a pair of angles that specify respective endpoints of the range or by a center angle that defines specific direction of arrival together with the width of the range.

In case the POI is defined only by its direction, it theoretically defines a spatial portion of the audio scene that spatially extends from the listening point to infinity. In another example, a POI is further defined to cover the specified direction(s) up to a first specified radius that hence defines the spatial distance from the listening point, thereby leaving a spatial portion of the audio scene that is in the direction covered by the POI but that is further away from the listening point than the first specified radius outside of the POI. In a further example, a POI is further defined to cover the specified direction(s) from a second specified radius to infinity, thereby leaving a spatial portion of the audio scene that is in the direction covered by the POI but that is closer to the listening point than the second specified radius outside the POI.

According to an example, the spatial analysis portion 222 may further employ at least some of the DOA and the DAR in identification of the POI for a frame of the input audio signal 115. The identification of the POI may rely on one or more POI identification criteria pertaining to one or more of the above-mentioned spatial parameters. The audio scene may be divided into predefined spatial portions (or spatial segments) for the POI identification, and the spatial analysis portion 222 may apply the POI identification criteria separately for each of the predefined spatial portions of the audio scene. The predefined spatial portions may be fixed e.g. such that the same predefined division into spatial portions is applied regardless of the audio scene under consideration. In another example, the division to the spatial portion is predefined in that it is fixed for analysis of the audio scene under consideration. In the latter scenario, the information that defines the division into the spatial portions may be received and/or derived on basis of input received from an external source, e.g. as user input received via a user interface.

As an example of predefined spatial portions, the spatial portions may be defined as spherical sectors of a (conceptual) sphere that surrounds the position of the audio capturing entity 210 (and hence position of the assumed listening point of the reconstructed audio signal 145). In this regard, the full range of azimuth angles (360°) and/or the full range of elevation angles (360°) may be equally divided into a respective predefined number of sectors of equal width, e.g. to four sectors (of 90°) or to eight sectors (of 45°). In another example, an uneven division into sectors may be applied for one or both of the azimuth angle and the elevation angle, e.g. such that narrower sectors are used in an area of the audio scene that is considered (perceptually) more important (e.g. in front of the assumed listening point) whereas wide sectors are used in an area of the audio scene that is considered (perceptually) less important (e.g. behind the assumed listening point).

According to an example, the identification criteria applied by the spatial analysis portion 222 may require that a certain spatial portion in a certain frame is designated as the POI in case one or more of the following conditions are met:

the DOAs computed for the frequency bands of the certain frame within the certain spatial portion of the audio scene are stable;

the DARs computed for the frequency bands of the certain frame within the certain spatial portion of the audio scene are sufficiently high;

the input audio signals 115-*j* of the certain frame represent an undesired directional sound source in the certain spatial portion of the audio scene.

As an example of a POI identification criterion concerning stability of the DOAs, the stability may be estimated in dependence of circular variance computed over DOAs within the spatial portion under consideration: this POI identification criterion may be considered met in response to the circular variance exceeding a predefined threshold. As an example in this regard, the circular variance may have a value in the range from 0 to 1 and the predefined threshold may be e.g. 0.9. The circular variance may be computed according to the following equation $$g_a = \sqrt{1 - \left|\frac{1}{N}\sum_{n=1}^{N}\theta_n\right|},$$

where $\theta_n$ denote the DOAs considered in the computation and N denotes the number of DOAs considered in the computation. In an example, the DOAs considered in the computation include all DOAs (across the frequency bands) that fall within spatial portion under consideration. In a variation of this example, the circular variance is computed separately for two or more subgroups or clusters of DOAs that fall within spatial portion under consideration and the criterion is met in response to each of the respective circular variances exceeding the predefined threshold. In this regard, the subgroups or clusters may be defined based on closeness of the circular mean of DOAs, for example by using a suitable clustering algorithm. In an example, the k-means clustering method known in the art may be employed for subgroup definition: As a first step, a predefined number of initial cluster centers are defined. The predefined number may be a predefined value stored in the spatial analysis portion 222 or a value received from an external source, e.g. as user input received via a user interface, while the initial cluster centers may be e.g. randomly selected from the DOAs computed in the spatial analysis portion 222. Each of the remaining DOAs is assigned to the closest cluster center, and after having assigned all DOAs each of the cluster centers is recomputed as an average of the DOAs assigned to the respective cluster. The clustering method continues by running one or more iteration rounds such that at each iteration round each of the DOAs is assigned to the closest cluster center and after having assigned all DOAs the iteration round is completed by re-computing the cluster centers as an average of the DOAs assigned to the respective cluster. The iteration may be repeated until the cluster centers do not change from the previous iteration round or until the change (e.g. a maximum change or an average change) from the previous iteration round is less than a predefined threshold. The circular variance may be computed according to the equation above separately for each cluster, thereby implementing the DOA stability estimation.

As an example of a POI identification criterion concerning sufficiently high values of the DARs, this criterion may be considered met in response to an average of the DARs (across frequency bands) within the spatial portion under consideration exceeding a predefined threshold. As an example, the predefined threshold in this regard may be set on basis of experimental data, e.g. such that first DAR values within a spatial portion of interest are derived on basis of for a first set of training data known to have one or more directional sound sources within the spatial portion of interest and second DAR values with the same spatial portion are derived on basis of second training data that is known not have any directional sound sources within the spatial portion of interest. The predefined threshold that denotes sufficiently high value of DAR may be defined in view of the first DAR values and the second DAR values such that the threshold serves to sufficiently discriminate between the DARs derived for the first and second sets. As another example, the predefined threshold value for the POI identification criterion that concerns sufficiently high DAR values may be received from an external source, e.g. as user input received via a user interface or the threshold value defined on basis of experimental data may be adjusted on basis of information received from an external source (e.g. as user input received via the user interface).

As an example of a POI identification criterion concerning a spatial portion under consideration including an undesired directional sound source, this condition may be considered met in response to a directional sound source identified within the spatial portion under consideration (e.g. based on DOAs) exhibits predefined audio characteristics, e.g. with respect to its frequency content. According to an example, the predefined audio characteristics in this regard may be defined based on experimental data that represents sound sources considered to represent an undesired signal type. A suitable classifier type known in the art may be arranged to carry out detection of signals that exhibit predefined audio characteristics so defined. In another example, an indication of presence of an undesired directional sound source within a spatial portion under consideration may be received from an external source, e.g. as user input received via a user interface.

In case the POI identification criteria is not met, there is no identified POI in the certain frame and the initial spatial audio signal 223 (e.g. one including the mid and side signals together with the spatial parameters) may be provided as the spatial audio signal 125 from the spatial audio encoder 220 without further processing or modification. In case the POI identification criteria is met, the certain frame is identified as one including a POI that is to be suppressed from the audio scene. Consequently, information that defines the POI identified in the audio scene is passed to a spatial filter 226 for modification of the audio scene therein. The information that defines the POI may be further passed to an ambience generator 224 and/or to the spatial mixer 140. The information that defines the POI may identify one of the predefined spatial portions of the audio scene as the POI. The spatial analysis portion 222 may further pass the initial spatial audio signal 223 derived therein and/or at least some of the input audio signals 115-*j* to the spatial filter 226 to facilitate modification of the audio scene therein.

In some examples, the spatial analysis portion 222 may proceed to derivation of the side signal (as described in the foregoing) after having applied the POI identification criteria: the spatial analysis portion 222 may proceed with deriving the side signal for inclusion in the initial spatial audio signal 223 for the certain frame in case there is no identified POI in the certain frame, whereas the spatial analysis portion 222 may refrain from deriving the side signal in case the certain frame is identified as one including a POI. In the latter scenario, the side signal may be derived in by the spatial filter 226 on basis of at least some of the audio input signals 115-*j*, as described in the following.

Referring now to operations pertaining to block 306, the spatial filter 226 may process the input audio signals 115-*j* in order to suppress the POI in the audio scene in response to receiving an indication of the POI being present therein. Herein, the expression 'spatial filtering' is to be construed in a broad sense, encompassing various approaches for providing the spatial audio signal 125 such that it conveys an audio scene different from that directly derivable from the input audio signals 115-*j* and that may have been encoded in the side signal by the spatial analysis portion 222, as described in the foregoing.

As an example of spatial filtering in this framework, the spatial filter 226 may modify the side signal provided as part of the initial spatial audio signal 223 such that the signal components that represent the POI therein are suppressed, e.g. completely removed or at least significantly attenuated. As an example in this regard, beamforming in parametric domain may be applied, for example according to a technique described in Politis, A. et al., "*Parametric spatial audio effects*", Proceedings of the 15$^{th}$ International Conference on Digital Audio Effects (DAFx-12), York, UK, Sep. 17-21, 2010. In another example, the spatial filter 226 may derive (or re-derive) the side signal on basis of the input audio signal 115 (e.g. the digital audio signals 115-*j*) such that the signal components that represent the POI are suppressed or excluded, thereby deriving the side signal for the spatial audio signal 125.

In an example of the latter approach, the spatial filter 226 may process the input audio signals 115-*j* using a beamforming technique known in the art, arranged to suppress the portion of the audio scene indicated by the POI, e.g. such that one or more nulls of the beamformer are steered towards direction(s) of arrival that correspond to the POI. Such beamforming results in providing a respective steered audio signal for each of the input audio signals 115-*j*, where the steered audio signals serve to represent a modified audio scene where the spatial portion of the audio scene corresponding to the POI is completely cancelled or at least significantly attenuated and hence substantially excluded from the resulting modified audio scene, thereby creating a gap in the audio scene. Such beamforming may be referred to as brickwall beamforming due to cancellation or substantial attenuation of the desired spatial portion of the audio scene recorded in the input audio signals 115-*j*.

The spatial audio filter 226 may proceed into creating the side signal components and combining them in to the side signal as described in the foregoing, with the exception of basing the side signal component creation on the steered audio signals obtained from the beamformer instead of using the respective input audio signals 115-*j* as such as basis for creating the side signal. The side signal so generated may be provided together with the main signal of the initial spatial audio signal 223 and the spatial parameters of the initial spatial audio signal 223 as the spatial audio signal 125 to the spatial mixer 140 for generation of the reconstructed spatial audio signal 145 therein.

Referring to operations pertaining to block 308, according to an example, generation of the complementary audio signal 127 on basis of the one or more further input audio signals 117-*k* is carried out by the ambience generator 224. Generation of the complementary audio signal 127 comprises identifying one or more of the further input audio signal(s) 117-*k* that originate from respective further microphones 113-*k* that are within or close to the POI, thereby representing audio content that is relevant for the POI. In this regard, the ambience generator 224 may have a priori knowledge regarding positions of the respective further microphones 113-*k* with respect to the audio scene represented by the input audio signal 125, and identification of the further microphones 113-*k* that are applicable for generation of the complementary audio signal 127 may be the based on their position information, such that further input audio signal(s) 117-*k* to be applied for generating the complementary audio signal 127 are those received from the identified further microphones 113-*k*.

Identification of the further microphone(s) 113-*k* and hence the further input audio signal(s) 117-*k* applicable for generation of the complementary audio signal 127 may be carried out by the ambience generator 224 on basis of the information regarding respective positions of the further microphones 113-*k*, based on an indication received from an external source, e.g. as user input received via a user interface, or as a combination of these two approaches (e.g. such that an automated identification of the applicable further microphones 113-*k* is refined or confirmed by the user).

As an example of microphone identification by the ambience generator 224, the identification may involve identifying one or more further microphones 113-*k* that have respective positions coinciding with the POI. Optionally, the microphone identification by the ambience generator 224 may further consider directional pattern of the further microphones 113-*k*: in an example, in case there are two or more microphones, the one(s) having a directional pattern pointing away from the microphone array 111 (that serves to capture the input audio signals 115-*j*) may be preferred and hence identified as source(s) for the further input audio signals 117-*k* that are applicable for generation of the complementary audio signal 127.

The microphone identification by the ambience generator 224 may further consider position of the further microphones 113-*k* within the POI: as an example, in case several further microphone(s) are identified within the POI, the one that is closest to the center of the POI may be identified as the one that is most suitable for generation of the complementary audio signal 127. In this regard, the center of the POI may be indicated e.g. by a circular mean of the (azimuth and/or elevation) angles that define the edges of the spatial portion identified as the POI. As another example of further microphone identification based on microphone position, the ambience generator 224 may identify multiple further microphones 113-*k* within the POI and use the respective further input audio signals 117-*k* for generation of a respective intermediate complementary audio signal for the respective sub-portions of the POI, which intermediate complementary audio signals are further combined to form the complementary audio signal 127. As an example in this regard, respective further input audio signals 117-*k* from two further microphones 113-*k* may be applied such that a first further input audio signal 117-$k_1$ is applied for generating a first intermediate complementary audio signal for (azimuth and/or elevation) angles from one edge of the spatial portion identified as POI to the center of the spatial portion (see an example of defining the center in the foregoing) whereas a second further input audio signal 117-$k_2$ is applied for generating a second intermediate complementary audio signal for (azimuth and/or elevation) angles from the center of the spatial portion to the other edge of the spatial portion. In another example, a first further input audio signal 117-$k_1$ is applied for generating a first intermediate complementary audio signal that represents the spatial portion identifies as POI up to a certain radius, whereas a second further input audio signal 117-$k_2$ is applied for generating a second intermediate complementary audio signal that represents the spatial portion from the certain radius.

The ambience generator 224 carries out ambience signal synthesis on basis of the respective further digital audio signals 117-*k* from the identified ones of the further microphones 113-*k* to generate the complementary audio signal 127 that is applicable for filling the gap in the audio scene resulting from operation of the spatial filter 226. In other words, the complementary audio signal 127 serves to substitute the POI of the audio scene in the reconstructed spatial audio signal 145. In this regard, the ambience signal synthesis is further provided with an indication of the POI within the audio scene to be covered by the complementary audio signal 127. The ambience generator 224 passes the generated complementary audio signal 127 to the spatial mixer 140 for generation of the reconstructed spatial audio signal 145 therein.

The ambience generator 224 may carry out the ambience signal synthesis by using the technique described in the co-pending patent application no. GB 1706290.2. An outline of this ambience synthesis technique is provided in the following.

In this regard, the ambience synthesis makes use of the one or more selected further input audio signals 117-*k*, originating from respective ones of the identified further microphones 113-*k* described in the foregoing. Ambience synthesis involves computing a further ambience signal as a weighted sum of the selected further input audio signals 117-*k* and applying spatial extent synthesis to the further ambience signal. The ambience synthesis may further comprise application of reverberation processing to the further ambience signal before using as a source signal for the spatial extent synthesis processing.

Computation of the further ambience signal comprises deriving a respective weight for each of the selected further input audio signals 117-*k*, preferably such that the sum of the weights is equal or substantially equal to unity. In case there is only one selected further input audio signal 117-*k*, derivation of the weights may be omitted and the selected further input audio signal 117-*k* may be used as such as the further ambience signal.

Computation of a weights may be obtained via analyses of respective selected further input audio signals 117-*k*, where the analysis determines a likelihood of the respective selected further input audio signal 117-*k* representing ambient background noise instead of representing a specific sound source: in case the likelihood is high(er), the respective the weight is assigned a high(er) value, whereas a low(er) likelihood results in assigning the respective weight a low(er) value.

The analysis carried out for determination of the weights is carried out using frames of predefined (temporal) length, which may different from the frame length applied in processing the input audio signals 115-*j* and the further input audio signal(s) 117-*k* for generation of the reconstructed spatial audio signal 145. As an example, the determination of weights may be carried out using frames of one second.

As an example, the procedure of assigning the weights may commence from setting a predefined initial value for each of the weights, followed by one or more analysis steps that each may change the weight value according to an outcome of the respective analysis step. As a non-limiting example in this regard, one or more of the following analysis steps may be applied for deriving the final weight for each selected further input audio signal 117-*k*:

- A selected further input audio signal 117-*k* may be subjected to voice activity detection (VAD) processing: in case the VAD indicates inactivity (i.e. indicates a signal that does not include speech), the respective weight may be increased, whereas in case the VAD indicates activity (i.e. indicates a signal that does include speech) the respective weight may be decreased. In this regard, any VAD technique known in the art may be applied.
- A selected further input audio signal 117-*k* may be subjected to analysis of spectral flatness: in case the analysis suggests noise-like signal (e.g. a flatness that is close to one), the respective weight may be increased, whereas in case the analysis suggests tone-like signal (e.g. a flatness that is close to zero), the respective weight may be decreased. In this regard, any spectral flatness analysis technique known in the art may be applied.
- A selected further input audio signal 117-*k* may be subjected to harmonicity analysis: in case the analysis suggests harmonic signal content (such as presence of features like fundamental frequency (pitch), harmonic concentration, harmonicity, . . . ) the respective weight may be decreased, whereas in case the analysis suggests absence of harmonic signal content the respective weight may be increased. In this regard, any harmonicity analysis technique known in the art may be employed.
- A selected further input audio signal 117-*k* may be subjected percussiveness analysis: in case the analysis suggests rhythmic signal content, the respective weight may be decreased, whereas in case the analysis does not suggest rhythmic signal content, the respective weight may be increased. In this regard, any percussiveness analysis technique known in the art may be applied.
- A selected further input audio signal 117-*k* may be subjected to classifier that serves to classify the respective signal into one of two or more predefined classes. The predefined classes may include, for example, noise, speech and music: in case the classification suggests noise content, the respective weight may be increased, whereas in case the classification suggests speech or music content, the respective weight may be decreased. The classifier is pre-trained using suitable training data that represents signals in the above-mentioned predefined classes. In this regard, a suitable classifier known in the art, such as a deep neural network, may be employed.

After having derived the weights for the selected further input audio signals 117-*k*, the weights may be normalized such that their sum is equal or substantially equal to one. In addition to or instead of one or more of the exemplifying analysis steps outlined in the foregoing, the derived weights may be adjusted or set on basis of information received from an external source, e.g. as user input received via a user interface.

The further ambience signal is created by computing a weighted sum of the selected further input audio signals 117-*k* using the derived weights, thereby providing the further ambience signal to be employed as the source signal for the spatial extent synthesis processing. As pointed out in the foregoing, optional reverberation processing may be applied to the further ambience signal before using it for spatial synthesis. In this regard, a suitable (digital) reverberator known in the art may be employed. Reverberation introduced by this processing serves to improve spaciousness of the further ambience signal.

Figure 4:
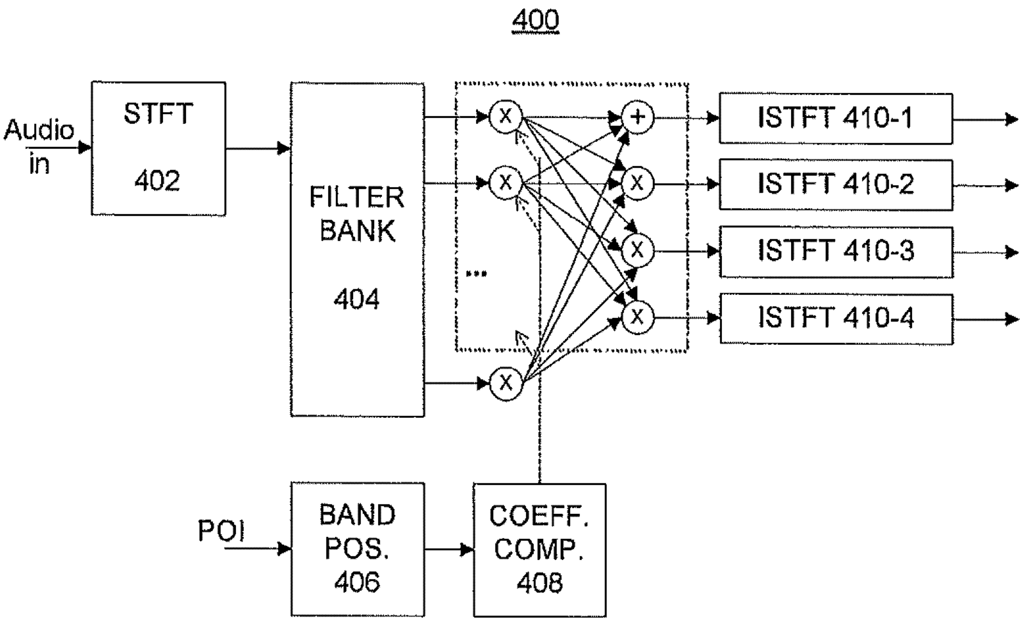
FIG. 4 illustrates a block diagram of some components and/or entities of a spatial extent synthesizer according to an example.

The further ambience signal may be subjected spatial extent synthesis, for example by using a spatial extent synthesizer 400 according to a block diagram depicted in FIG. 4, operation of which is outlined in the following. The spatial extent synthesizer 400 may be applied to implement the spatial extent synthesis described in detail e.g. in Pihlajamäki, T. et al., "*Synthesis of Spatially Extended Virtual Sources with Time-Frequency Decomposition of Mono Signals*", the Journal of Audio Engineering Society (JAES), Volume 62, Issue 7/8, pp. 467-484, July 2014.

The spatial extent synthesizer 400 receives the further ambience signal and processes it in frames of predefined (temporal) length (i.e. duration). Assuming 48 kHz sampled further ambience signal, the processing may be carried out on overlapping 1024-sample analysis frames, such that each analysis frame includes 512 new samples together with the most recent 512 samples of the immediately preceding frame. The analysis frame is zero-padded to twice its size (to 2048 samples) and windowed using a suitable analysis window, such as the Hann window. Each analysis frame is subjected to the STFT 402, thereby obtaining a frequency-domain representation of the analysis frame including 2048 frequency-domain samples. Due to symmetry of the frequency-domain representation, it is sufficient to process a truncated frequency-domain frame that is formed by its positive (first) half of 1024 samples together with the DC component, including 1025 frequency-domain samples per frame.

The truncated frequency-domain frame is processed by a filterbank 404, thereby decomposing the frequency-domain representation into predefined number of non-overlapping frequency bands. In an example, nine frequency bands may be used. The operation of the filter bank 404 may be implemented, for example, by storing a respective set of predefined filterbank coefficients for each of the frequency bands and by multiplying the frequency-domain samples of the truncated frequency-domain frame by sets of predefined filterbank coefficients to derive the respective frequency band outputs from the filterbank 404.

In parallel, information that defines the POI identified for the (temporally) corresponding frame of the input audio signals 115-*j* is provided to a band position calculator 406. As described in the foregoing, the POI may be defined, for example, as spatial portion that spans a range of certain azimuth and/or elevation angles. In this regard, the band position calculator 406 computes a respective spatial position for each of the frequency band signals obtained from the filterbank 404. As an example, the frequency band signals may be evenly distributed across the range of azimuth and/or elevation angles that define the POI. As a concrete example in this regard, assuming a POI that covers a sector having a width of 90 degrees positioned directly in front of the assumed listening point (e.g. azimuth angles from −45 to 45 degrees), the band position calculator 406 may set nine frequency band signals to be centered, respectively, at the following azimuth angles: 45, 33.75, 22.5, 11.25, 0, −11.25, −22.5, −33.75 and −45 degrees.

The band position calculator 406 provides an indication of the computed frequency band positions coefficient computation portion 408, which derives gain coefficients that implement spatial extent synthesis on basis of the frequency band signals provided from the filterbank 404 in view of loudspeaker positions of a predefined loudspeaker arrangement. As a non-limiting example, the spatial extent synthesizer 400 of FIG. 4 employs four output channels (e.g. front left (FL), front right (FR), rear left (RL) and rear right (RR) channels/loudspeakers). The gain coefficients that implement panning to a desired spatial position (i.e. the spatial portion defined by the POI) may be computed by using a Vector Base Amplitude Panning (VBAP) in view of the frequency band positions obtained from the band position calculator 406. The output of the VBAP is a respective audio channel signal for each loudspeaker of the predefined loudspeaker arrangement, which audio channel signals are further subjected to inverse STFT by respective one of the inverse STFT entities 410-1 to 410-4, thereby arriving at respective time-domain audio signals that constitute the complementary audio signal 127.

In an example, the ambience generator 224 may generate a plurality of (e.g. two or more) candidate complementary audio signals and select one of the candidate complementary audio signals as the complementary audio signal 127 based on a similarity measure that compares one or more characteristics of each candidate complementary audio signal to those of the POI in the audio scene conveyed by the input audio signals 115-*j*. In this regard, each of the candidate complementary audio signals may be generated on basis of a different further input audio signal 117-*k* or on basis of a different combination of two or more further input audio signals 117-*k*. The similarity measure may consider, for example, spectral and/or timbral similarity between a candidate complementary audio signal and the POI in the audio scene conveyed by the input audio signals 115-*j*. The ambience generator 224 may select the candidate complementary audio signal that according to the similarity measure provides the closest match with the POI in the audio scene conveyed by the input audio signals 115-*j*.

In an example, the ambience generator 224 may generate the complementary audio signal in two or more parts, such that each part is generated on basis of a different further input audio signal 117-*k* or on basis of a different combination of two or more further input audio signals 117-*k*. As an example in this regard, a first complementary signal may be derived on basis of a first further input audio signal 117-$k_1$, a second complementary signal may be derived on basis of a second further input audio signal 117-$k_2$, and the first and second complementary signals may be combined (e.g. summed) to form the complementary audio signal 127 for provision to the spatial mixer 140. In such a scenario, as an example, the first further input audio signal 117-$k_1$ and the second further input audio signal 117-$k_2$ may originate from respective further microphones 113-$k_1$, 113-$k_2$ that are arranged in opposite sides of the audio scene.

The ambience generator 224 may further carry out spectral envelope matching for the generated complementary audio signal 127 before passing it to the spatial mixer 150. The spectral envelope matching may comprise estimating the spectral envelope of the POI in the audio scene conveyed by the input audio signals 115-*j* and modifying the spectral envelope of the generated complementary audio signal 127 to match or substantially match the estimated spectral envelope. This may serve to provide a more naturally-sounding complementary audio signal 127, thereby facilitating improved perceivable quality of the reconstructed spatial audio signal 145.

Referring to operations pertaining to block 310, the manner and details of combining the complementary audio signal 127 with the spatial audio signal 125 depends on the format applicable for the audio reproduction entity 150.

As an example, in case the audio reproduction entity 150 comprises headphones or a headset, the spatial mixer 140 may prepare the reconstructed audio signal 145 for binaural rendering. In this regard, the spatial mixer may store a plurality of pairs of head-related transfer functions (HRTFs), each pair corresponding to a respective predefined DOA, select the predefined pair of HRTFs in view of the DOA received in the spatial audio signal 125 and apply the selected pair of HRTFs to the spatial audio signal 125 and to the complementary audio signal 127 to generate the left and right channels of the reconstructed spatial audio signal 145. As an example, the selected pair of HRTFs may be applied to the main signal to generate left and right main signal components, to the side signal to generate left and right side signal components and to the complementary audio signal to generate left and right complementary signal components. The spatial mixer 140 may compose the left channel of the reconstructed spatial audio signal 145 as a sum of the left main signal component, the left side signal component and the left complementary signal component, whereas the right channel of the reconstructed spatial audio signal 145 may be composed as a sum of the right main signal component, the right side signal component and the right complementary signal component.

As an example, in case the audio reproduction entity 150 comprises a multi-channel loudspeaker arrangement, the spatial mixer 140 may employ a respective Vector Base Amplitude Panning (VBAP) in view of the DOA received in the spatial audio signal 125 to derive respective components of the main signal, the side signal and the complementary audio signal 127 for each output channel and compose the, for each output channel, the respective channel of the reconstructed spatial audio signal 145 as a sum of the main signal component, the side signal component and complementary signal component derived for the respective output channel.

In an example, the spatial audio signal 125 and the complementary audio signal 127 are combined into the reconstructed spatial audio signal 145 in frequency domain. In such a scenario, the spatial mixer 140 may convert the reconstructed spatial audio signal 145 from frequency domain to time domain using an inverse STFT e.g. by using the overlap-add method known in the art before passing the reconstructed spatial audio signal 145 to the audio reproduction entity 150 (and/or providing it for storage in a storage means). In another example, the spatial mixer 140 may transform each of the spatial audio signal 125 and the complementary audio signal 127 from frequency domain to time domain before combining them into the reconstructed spatial audio signal 145 and carry out the combination procedure to obtain the reconstructed spatial audio signal 145 along the lines described in the foregoing, mutatis mutandis, for the respective time domain signals.

In the foregoing, the method 300 has been described, at least implicitly, with a reference to a single POI in the spatial audio scene. The method 300, however, readily generalizes into an approach where the operations pertaining to block 304 may serve to identify two or more POIs within the audio scene represented by the input audio signal 115. In such a scenario, operations pertaining to block 306 are carried out to suppress all identified POIs from the audio scene, operations pertaining to block 308 are carried out to generate a respective complementary audio signal 127 for each of the identified POIs, while operations pertaining to block 310 are carried out to combine each of the generated complementary audio signals 127 with the spatial audio signal 125.

In another variation, alternatively or additionally, the operations pertaining to blocks 304 to 310 are based on spatial audio signal format different from the described in the foregoing. As an example in this regard, the spatial analysis portion 222 may extract a dedicated set of spatial parameters, e.g. the DOAs, the DARs and the delay values described in the foregoing, for a plurality of predefined spatial portions, e.g. for a plurality of spherical sectors. In such a scenario, identification of the POI via usage of the POI identification criteria may hence be carried out directly for each predefined spatial portion by considering the set spatial parameters extracted for the respective predefined spatial portion (block 304), whereas suppressing the identified POI (block 306) may be carried out in a straightforward manner by excluding the spatial parameters extracted for the predefined spatial portion identified as POI. Operations pertaining to blocks 308 and 310 may be carried as described in the foregoing also for this scenario.

Figure 5:
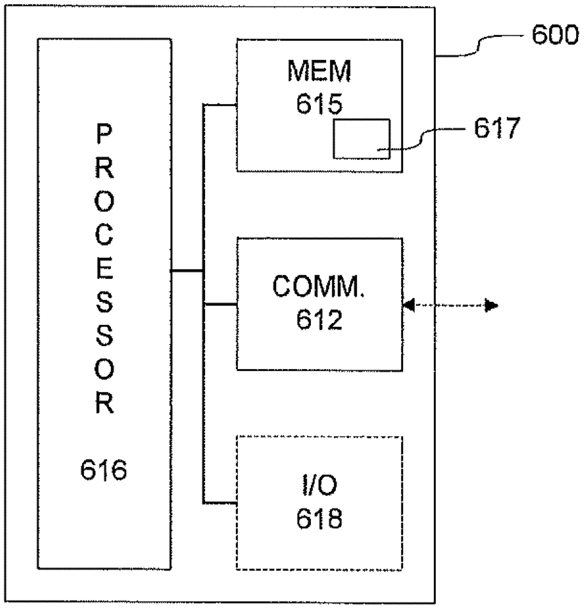
FIG. 5 illustrates a block diagram of some components and/or entities of an apparatus for spatial audio analysis according to an example.

FIG. 5 illustrates a block diagram of some components of an exemplifying apparatus 600. The apparatus 600 may comprise further components, elements or portions that are not depicted in FIG. 5. The apparatus 600 may be employed in implementing the spatial audio encoder 220, possibly together with the spatial mixer 140 and/or further audio processing entities.

The apparatus 600 comprises a processor 616 and a memory 615 for storing data and computer program code 617. The memory 615 and a portion of the computer program code 617 stored therein may be further arranged to, with the processor 616, to implement the function(s) described in the foregoing in context of the spatial audio encoder 220 and/or the spatial mixer 140.

The apparatus 600 may comprise a communication portion 612 for communication with other devices. The communication portion 612 comprises at least one communication apparatus that enables wired or wireless communication with other apparatuses. A communication apparatus of the communication portion 612 may also be referred to as a respective communication means.

The apparatus 600 may further comprise user I/O (input/output) components 418 that may be arranged, possibly together with the processor 616 and a portion of the computer program code 617, to provide a user interface for receiving input from a user of the apparatus 600 and/or providing output to the user of the apparatus 600 to control at least some aspects of operation of the spatial audio encoder 220 and/or the spatial mixer 140 implemented by the apparatus 600. The user I/O components 618 may comprise hardware components such as a display, a touchscreen, a touchpad, a mouse, a keyboard, and/or an arrangement of one or more keys or buttons, etc. The user I/O components 618 may be also referred to as peripherals. The processor 616 may be arranged to control operation of the apparatus 600 e.g. in accordance with a portion of the computer program code 617 and possibly further in accordance with the user input received via the user I/O components 618 and/or in accordance with information received via the communication portion 612.

The apparatus 600 may comprise the audio capturing entity 110, e.g. the microphone array 111 including the microphones 111-*j* that serve to record the digital audio signals 115-*j* that constitute the input audio signal 115.

Although the processor 616 is depicted as a single component, it may be implemented as one or more separate processing components. Similarly, although the memory 615 is depicted as a single component, it may be implemented as one or more separate components, some or all of which may be integrated/removable and/or may provide permanent/semi-permanent/dynamic/cached storage.

The computer program code 617 stored in the memory 615, may comprise computer-executable instructions that control one or more aspects of operation of the apparatus 600 when loaded into the processor 616. As an example, the computer-executable instructions may be provided as one or more sequences of one or more instructions. The processor 616 is able to load and execute the computer program code 617 by reading the one or more sequences of one or more instructions included therein from the memory 615. The one or more sequences of one or more instructions may be configured to, when executed by the processor 616, cause the apparatus 600 to carry out operations, procedures and/or functions described in the foregoing in context of the spatial audio encoder 220 and/or the spatial mixer 140.

Hence, the apparatus 600 may comprise at least one processor 616 and at least one memory 615 including the computer program code 617 for one or more programs, the at least one memory 615 and the computer program code 617 configured to, with the at least one processor 616, cause the apparatus 600 to perform operations, procedures and/or functions described in the foregoing in context of the spatial audio encoder 220 and/or spatial mixer.

The computer programs stored in the memory 615 may be provided e.g. as a respective computer program product comprising at least one computer-readable non-transitory medium having the computer program code 617 stored thereon, the computer program code, when executed by the apparatus 600, causes the apparatus 600 at least to perform operations, procedures and/or functions described in the foregoing in context of the spatial audio encoder 220 and/or the spatial mixer 140. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Herein, reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

In the following, further illustrative and non-limiting example embodiments of the spatial audio processing technique described in the present disclosure are described in a form of a list of numbered clauses.

Clause 1. An apparatus for spatial audio processing on basis of two or more input audio signals that represent an audio scene and at least one further input audio signal that represents at least part of the audio scene, the apparatus configured to identify a portion of interest, POI, in the audio scene;

process the two or more input audio signals into a spatial audio signal where the POI in the audio scene is suppressed;

generate, on basis of the at least one further input audio signal, a complementary audio signal that represents the POI in the audio scene; and combine the complementary audio signal with the spatial audio signal to create a reconstructed spatial audio signal.

Clause 2. An apparatus according to clause 1, further comprising a microphone array of two or more microphones, configured to record said two or more input audio signals on basis of a sound captured by a respective microphone of the microphone array.

Clause 3. An apparatus according to clause 1 or 2, further configured to receive the at least one further input audio signal from one or more external microphones configured to record a respective further input audio signal on basis of a sound captured by respective one of said one or more further microphones.

Clause 4. An apparatus according any of clauses 20 to 22, wherein identification of the POI comprises identifying, for a plurality of predefined spatial portions of the audio scene, whether the respective spatial portion represents a POI.

Clause 5. An apparatus according to clause 4, wherein said plurality of predefined spatial portions comprises a plurality of spherical sectors.

Clause 6. An apparatus according to any of clauses 20 to 5, wherein identification of the POI comprises receiving an indication of the POI as user input.

Clause 7. An apparatus according to any of clauses 20 to 5, wherein identification of the POI comprises extracting, on basis of the two or more input audio signals, spatial parameters that are descriptive of the audio scene represented by the two or more input audio signals; and identifying the POI on basis of one or more POI identification criteria evaluated at least in part on basis of the extracted spatial parameters.

Clause 8. An apparatus according to clause 7, wherein extracting said spatial parameters comprises extracting a respective dedicated set of spatial parameters for the plurality of predefined spatial portions of the audio scene; and identifying the POI comprises identifying a predefined spatial portion at least in part on basis of the dedicated set of spatial parameters extracted for the respective predefined spatial portion.

Clause 9. An apparatus according to clause 7 or 8, wherein said spatial parameters include a respective direction of arrival, DOA, and a direct to ambient ratio, DAR, for a plurality of frequency bands and wherein said POI identification criteria comprise one or more of the following:

the DOAs across the plurality of frequency bands exhibit variation that is smaller than a respective predefined threshold the DARs across the plurality of frequency bands are higher than a respective predefined threshold.

Clause 10. An apparatus according to clause 9, wherein the DOAs across the plurality of frequency bands are considered to exhibit variation that is smaller than said respective predefined threshold in response to a circular variance computed over said DOAs being smaller than a respective predefined threshold value.

Clause 11. An apparatus according to clause 9 or 10, the DARs across the plurality of frequency bands are considered to be higher than said respective predefined threshold in response to the average of said DARs exceeding a respective predefined threshold value.

Clause 12. An apparatus according to any of clauses 20 to 11, wherein processing the two or more input audio signals comprises suppressing ambience of the audio scene within the POI.

Clause 13. An apparatus according to any of clauses 20 to 12, wherein processing the two or more input audio signals comprises generating, on basis of the two or more input audio signals, a first signal that represents directional sound sources of the audio scene, and a second signal that represents ambience of the audio scene such that the ambience corresponding to the POI is suppressed, Clause 14. An apparatus according to clause 13, wherein generating the first signal comprises identifying a predefined number of input audio signals originating from respective microphones that are closest to the direction of arrival identified for a directional sound source of the audio scene;

time-aligning other identified input audio signals with the one that originates from a microphone that is closest to the direction of arrival identified for said directional sound source;

providing the first signal as a linear combination of the identified and time-aligned input audio signals.

Clause 15. An apparatus according to clause 13 or 14, wherein generating the second signal comprises providing the second signal as a linear combination of said one or more input audio signals.

Clause 16. An apparatus according to any of clauses 13 to 15, wherein generating the second signal comprises applying a beamforming to the two or more input audio signals such that directions of arrival corresponding to the POI are suppressed.

Clause 17. An apparatus according to clause 16, wherein applying the beamforming comprises steering one or more nulls of a beamformer towards directions of arrival corresponding to the POI.

Clause 18. An apparatus according to any of clauses 20 to 17, wherein generating the complementary audio signal comprises identifying at least one of the at least one further input audio signal that originates from a respective microphone that is within or close to the POI;

generating, on basis of the identified at least one further input audio signal, the complementary audio signal that represents the POI in the audio scene.

Clause 19. An apparatus according to clause 18, wherein generating the complementary audio signal comprises deriving an ambience signal as a weighted sum of said identified at least one further input audio signal;

defining a respective spatial position within the POI for a plurality of frequency bands of the ambience signal;

deriving, in dependence of the respective spatial position, respective one or more gain coefficients that implement panning to said spatial position; and generating the complementary audio signal by multiplying the ambience signal in each of said plurality of frequency bands by the respective one or more gain coefficients.

Clause 20. An apparatus for spatial audio processing on basis of two or more input audio signals that represent an audio scene and at least one further input audio signal that represents at least part of the audio scene, the apparatus comprising means for identifying a portion of interest, POI, in the audio scene;

means for processing the two or more input audio signals into a spatial audio signal where the POI in the audio scene is suppressed;

means for generating, on basis of the at least one further input audio signal, a complementary audio signal that represents the POI in the audio scene; and means for combining the complementary audio signal with the spatial audio signal to create a reconstructed spatial audio signal.

Clause 21. An apparatus for spatial audio processing on basis of two or more input audio signals that represent an audio scene and at least one further input audio signal that represents at least part of the audio scene, wherein the apparatus comprises at least one processor; and at least one memory including computer program code, which when executed by the at least one processor, causes the apparatus to:

identify a portion of interest, POI, in the audio scene;

process the two or more input audio signals into a spatial audio signal where the POI in the audio scene is suppressed;

generate, on basis of the further audio signal, a complementary audio signal that represents the POI in the audio scene; and combine the complementary audio signal with the spatial audio signal to create a reconstructed audio signal.

Clause 22. A computer program product comprising computer readable program code tangibly embodied on a non-transitory computer readable medium, the program code configured to cause performing the method according to any of clauses 1 to 19 when run a computing apparatus.

Throughout the present disclosure, although functions have been described with reference to certain features, those functions may be performable by other features whether described or not. Although features have been described with reference to certain embodiments, those features may also be present in other embodiments whether described or not.

The invention claimed is:

1. An apparatus comprising:

at least one processor; and at least one memory storing instructions that, when executed with the at least one processor, cause the apparatus at least to:

identify a portion of interest in an audio scene;

process two or more input audio signals to obtain a spatial audio signal, wherein the spatial audio signal represents the audio scene with the portion of interest suppressed, wherein the two or more input audio signals represent the audio scene;

generate based, at least partially, on at least one further input audio signal representing at least part of the audio scene, a complementary audio signal that represents the portion of interest in the audio scene; and combine the complementary audio signal with the spatial audio signal to create a reconstructed spatial audio signal.

2. The apparatus according to claim 1, wherein identifying the portion of interest comprises the at least one memory stores instructions that, when executed with the at least one processor, cause the apparatus to:

receive an indication of the portion of interest.

3. The apparatus according to claim 1, wherein generating the complementary audio signal comprises the at least one memory stores instructions that, when executed with the at least one processor, cause the apparatus to:

generate a set of spatial audio parameters associated with the point of interest, wherein the set of spatial audio parameters comprise at least one of:

a direction of arrival;

a direct-to-ambient ratio; or a delay value.

4. The apparatus according to claim 1, wherein the at least one memory stores instructions that, when executed with the at least one processor, cause the apparatus to:

obtain the at least one further input audio signal.

5. The apparatus according to claim 1, wherein the at least one memory stores instructions that, when executed with the at least one processor, cause the apparatus to:

receive the at least one further input audio signal as at least one digital audio signal recorded on basis of a sound captured with respective one or more microphones.

6. The apparatus according to claim 1, wherein identifying the portion of interest comprises the at least one memory stores instructions that, when executed with the at least one processor, cause the apparatus to:

identify, for a plurality of predefined spatial portions of the audio scene, whether a respective spatial portion represents the portion of interest to be replaced during rendering.

7. The apparatus according to claim 6, wherein the plurality of predefined spatial portions comprises a plurality of spherical sectors.

8. The apparatus according to claim 1, wherein identifying the portion of interest comprises the at least one memory stores instructions that, when executed with the at least one processor, cause the apparatus to:

extract, on basis of the two or more input audio signals, spatial parameters that are descriptive of the audio scene represented with the two or more input audio signals; and identify the portion of interest based, at least partially, on one or more portion of interest identification criteria based, at least in part, on the extracted spatial parameters.

9. The apparatus according to claim 8, wherein the spatial parameters include a respective direction of arrival, and a respective direct to ambient ratio, for frequency bands of a plurality of frequency bands and wherein the one or more portion of interest identification criteria comprise one or more of the following:

directions of arrival across the plurality of frequency bands exhibit variation that is smaller than a respective first predefined threshold; or direct to ambient ratios across the plurality of frequency bands are higher than a respective second predefined threshold.

10. The apparatus according to claim 9, wherein the directions of arrival across the plurality of frequency bands are considered to exhibit variation that is smaller than the respective first predefined threshold in response to a circular variance computed over the directions of arrival being smaller than the respective first predefined threshold.

11. The apparatus according to claim 9, wherein the direct to ambient ratios across the plurality of frequency bands are higher than the respective second predefined threshold in response to an average of the direct to ambient ratios exceeding the respective second predefined threshold.

12. The apparatus according to claim 1, wherein processing the two or more input audio signals comprises the at least one memory stores instructions that, when executed with the at least one processor, cause the apparatus to:

suppress ambience of the audio scene within the portion of interest.

13. The apparatus according to claim 1, wherein generating the complementary audio signal comprises the at least one memory stores instructions that, when executed with the at least one processor, cause the apparatus to:

identify at least one of the at least one further input audio signal that originates from a respective microphone that is within or close to the portion of interest; and generate, from the at least one identified audio signal, the complementary audio signal that represents the portion of interest in the audio scene.

14. The apparatus according to claim 13, wherein generating the complementary audio signal comprises the at least one memory stores instructions that, when executed with the at least one processor, cause the apparatus to:

derive at least one ambience parameter based, at least partially, on a weighted sum of the at least one identified audio signal;

define a respective spatial position within the portion of interest for a plurality of frequency bands of ambience of the audio scene;

derive, in dependence of the respective spatial position, respective one or more gain coefficients that implement panning to the respective spatial position; and generate the complementary audio signal based, at least partially, on, multiplying the at least one ambience parameter of the plurality of frequency bands by the respective one or more gain coefficients.

15. A method comprising:

identifying a portion of interest in an audio scene;

processing two or more input audio signals to obtain a spatial audio signal, wherein the spatial audio signal represents the audio scene with the portion of interest suppressed, wherein the two or more input audio signals represent the audio scene;

generating based, at least partially, on at least one further input audio signal representing at least part of the audio scene, a complementary audio signal that represents the portion of interest in the audio scene; and combining the complementary audio signal with the spatial audio signal to create a reconstructed spatial audio signal.

16. The method according to claim 15, wherein the identifying of the portion of interest comprises:

receiving an indication of the portion of interest.

17. The method according to claim 15, wherein the generating of the complementary audio signal comprises:

generating a set of spatial audio parameters associated with the point of interest, wherein the set of spatial audio parameters comprise at least one of:

a direction of arrival;

a direct-to-ambient ratio; or a delay value.

18. The method according to claim 15, further comprising:

obtaining the at least one further input audio signal.

19. The method according to claim 15, further comprising:

receiving the at least one further input audio signal as at least one digital audio signal recorded on basis of a sound captured with respective one or more microphones.

20. A non-transitory computer-readable medium comprising instructions stored thereon for performing at least the following:

identifying a portion of interest in an audio scene;

processing two or more input audio signals to obtain a spatial audio signal, wherein the spatial audio signal represents the audio scene with the portion of interest suppressed, wherein the two or more input audio signals represent the audio scene;

generating based, at least partially, on at least one further input audio signal representing at least part of the audio scene, a complementary audio signal that represents the portion of interest in the audio scene; and combining the complementary audio signal with the spatial audio signal to create a reconstructed spatial audio signal.

* * * * *